United States Patent [19]

Melnyk et al.

[11] Patent Number: 5,253,623
[45] Date of Patent: Oct. 19, 1993

[54] METHOD OF CONTROLLING COMBUSTION ENGINE TIMING

[75] Inventors: Borys J. Melnyk, Allen Park; Michael J. Cullen, Dearborn, both of Mich.

[73] Assignee: Ford Motor Company, Dearborn, Mich.

[21] Appl. No.: 927,709

[22] Filed: Aug. 10, 1992

[51] Int. Cl.$^5$ .................. F02D 41/16; F02D 43/00
[52] U.S. Cl. ...................... 123/339; 123/418
[58] Field of Search ..................... 123/339, 418

[56] References Cited

U.S. PATENT DOCUMENTS

| | | | |
|---|---|---|---|
| Re. 33,027 | 8/1989 | Danno et al. | 123/339 |
| 4,328,775 | 5/1982 | Ironside | 123/339 |
| 4,338,899 | 7/1982 | Geiger et al. | 123/339 |
| 4,344,397 | 8/1982 | Geiger et al. | 123/339 |
| 4,389,989 | 6/1983 | Hartig | 123/339 |
| 4,509,477 | 4/1985 | Takao et al. | 123/339 |
| 4,552,109 | 11/1985 | Boccadoro et al. | 123/339 |
| 4,572,127 | 2/1986 | Morris | 123/418 X |
| 4,676,211 | 6/1987 | Kiuchi et al. | 123/339 |
| 4,696,272 | 9/1987 | Kato et al. | 123/339 |
| 4,719,573 | 1/1988 | Kissel et al. | 364/431.07 |
| 4,879,656 | 11/1989 | Quigley et al. | 364/431.05 |
| 4,883,034 | 11/1989 | Yashiki et al. | 123/339 |
| 4,890,592 | 1/1990 | Furuyama et al. | 123/417 |
| 4,933,863 | 6/1990 | Okano et al. | 364/431.07 |
| 5,016,180 | 5/1991 | Fujisawa | 364/431.04 |
| 5,024,197 | 6/1991 | Nakamura | 123/339 |
| 5,033,432 | 7/1991 | Ohuchi et al. | 123/339 |

*Primary Examiner*—Tony M. Argenbright
*Attorney, Agent, or Firm*—Roger L. May; Peter Abolins

[57] ABSTRACT

A method is provided for maintaining the speed of a spark-ignited internal combustion engine operating at a desired idle speed to compensate for engine speed variations caused by torque disturbances, utilizing an actual idle speed and the desired idle speed expressed as an RPM error ratio. A desired operating torque ratio is determined based on the torque available, a torque ratio reserve created by retarding spark from the maximum spark advance value and a torque ratio correction which reflects the torque disturbance. A desired final spark advance value is obtained from the desired operating torque ratio utilizing a nonlinear relationship between spark advance and torque ratio. The spark advance is modified to the desired final spark advance value so as to vary the torque supplied by the engine in order to maintain the desired idle speed.

26 Claims, 11 Drawing Sheets

METHOD OF CONTROLLING COMBUSTION ENGINE TIMING

TECHNICAL FIELD

The present invention relates to controlling the ignition timing of an internal combustion engine to maintain stable engine idle speeds.

BACKGROUND ART

Generally, it is desirable for an internal combustion engine to maintain a stable idle speed. By maintaining a stable idle speed, stalling of the engine due to load, or torque, variations can be minimized.

The prior art teaches many methods of idle speed control. For example, U.S. Pat. No. 4,719,573, issued to Kissel et al., discloses a method for idle speed control for an engine equipped with a fuel/air mixture means and an air bypass means. The spark advance is temporarily changed in response to idle speed changes due to changing engine load, either by retarding or advancing the spark advance value. Thus, the idle speed is moved to the targeted value and held there until the air bypass system has a chance to respond. As the air bypass valve is properly positioned, the spark advance is changed back to a steady state value, allowing the idle speed actuator valve or motor to operate in a stable manner without the undesirable effects of slow response.

U.S. Pat. No. 4,696,272, issued to Kato et al., discloses an ignition timing control method for internal combustion engines. The method is adapted to control the timing of the ignition of a mixture being supplied to the engine and includes the steps of retarding a determined ignition timing value by a predetermined amount when the engine is in a predetermined idling region and the engine temperature exceeds a predetermined value, and setting a desired idling speed in response to operating conditions of the engine. The method also includes the steps of calculating a correction value by multiplying the difference between a desired idle speed and an actual engine speed by a predetermined coefficient, and correcting the ignition timing value retarded by the predetermined amount by the correction value thus calculated.

U.S. Pat. No. 4,509,477, issued to Takao et al., discloses a method and apparatus for idle operation control of internal combustion engines. The control of the rotational speed of the engine to a predetermined value during idle operation is performed by detecting an engine rotational speed variation characteristic, detecting an engine torque variation characteristic and detecting a phase difference between the two characteristics on the basis of the engine rotational speed. An engine torque variation condition is determined at the present moment on the basis of the torque variation characteristic data and the phase difference data and an engine operation parameter, such as ignition timing, is then corrected in a direction to minimize the engine torque variation.

Other patents related to controlling the idle speed of an internal combustion engine include U.S. Pat. No. Re. 33,027, issued to Danno et al., U.S. Pat. No. 5,033,432, issued to Ohuchi et al., U.S. Pat. No. 5,024,197, issued to Nakamura, U.S. Pat. No. 5,016,180, issued to Fujisawa, U.S. Pat. No. 4,933,863, issued to Okano et al., U.S. Pat. No. 4,890,592, issued to Furuyama et al., U.S. Pat. No. 4,883,034, issued to Yashiki et al., U.S. Pat. No. 4,879,656, issued to Quigley et al., U.S. Pat. No. 4,676,211, issued to Kiuchi et al. and U.S. Pat. No. 4,552,109, issued to Boccadoro et al.

Previous strategies, however, utilized only one or two fixed values of spark retard, restricting the degrees of freedom of these strategies and only crudely approximating the complex behavior of spark advance as a function of speed and load.

SUMMARY OF THE INVENTION

It is an object of the present invention to maintain the idle speed of an internal combustion engine.

It is an additional object of the present invention to maintain the idle speed of an internal combustion engine utilizing an idle feedback spark control system.

It is yet a further object of the present invention to maintain the idle speed of an internal combustion engine by compensating for load disturbances utilizing a torque-based calculation of the required spark advance.

In carrying out the above objects and other objects and features of the present invention, a method is provided for maintaining the speed of a spark-ignited internal combustion engine operating at a desired idle speed to compensate for engine speed variations caused by torque disturbances. The engine is controlled according to a control strategy by an electronic controller having a memory. The method comprises the step of determining a desired final spark advance utilizing an actual idle speed and the desired idle speed expressed as an RPM error ratio to linearize the control strategy. In the preferred embodiment, the RPM error ratio is equivalent to the torque disturbance and the operating engine torque, expressed as a torque ratio. The torque ratio represents the amount of torque correction required to compensate for the torque disturbance.

The strategy of the present invention, to control engine RPM through spark advance adjustments, is intuitively understandable, but the task of accomplishing it is complicated by two non-linearities. First, the relationship between spark advance and torque is non-linear. Second, the relationship between and engine RPM error and torque is also non-linear.

The benefits accruing to the present invention are numerous, since the strategy takes advantage of a torque ratio formulation. First, the present invention linearizes the relationship between RPM error and torque, so as to ensure the requested torque is accurately delivered. Second, the desired torque compensation is correct regardless of engine operating conditions, such as engine RPM and load. Lastly, the strategy of the present invention is calibratable with one parameter, which effectively defines the amount of torque the strategy will supply on demand. The operating spark which supplies its reserve of torque is calculated without additional calibration efforts.

The above objects and other objects, features and advantages of the present invention will be readily appreciated by one of ordinary skill in the art from the following detailed description of the best mode for carrying out the invention when taken in connection with the accompanying drawings.

BEST MODE FOR CARRYING OUT THE INVENTION

Figure 1:
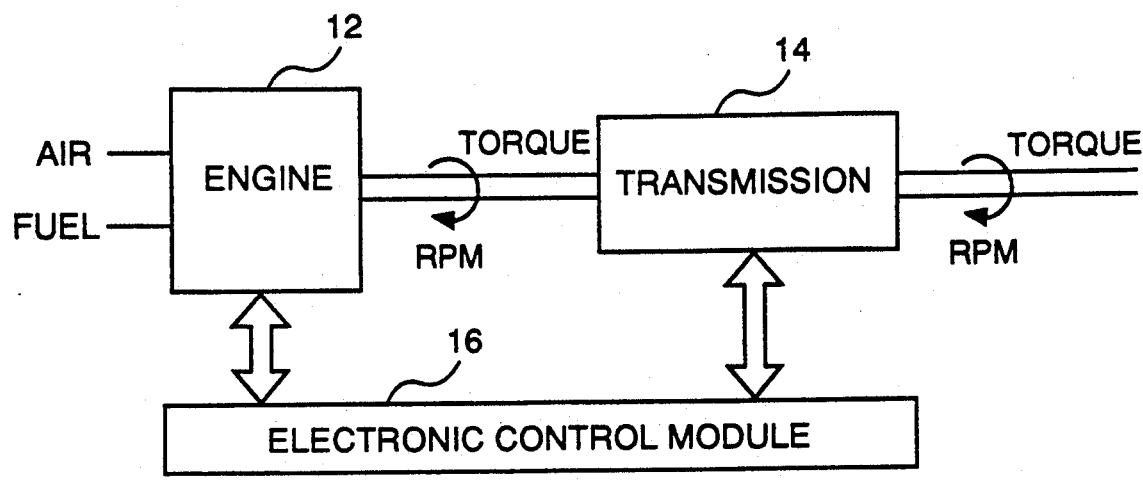
FIG. 1 is a block diagram of a controller for use with the present invention.

As shown in FIG. 1, air and fuel are supplied to an engine 12, which has an RPM output and a torque output applied to a transmission 14. The engine 12 and the transmission 14 are coupled to an electronic control module 16. Preferably, the control module 16 receives data relating to operation of the engine 12 and the transmission 14 from a plurality of sensors not specifically illustrated and accordingly executes the combustion engine timing strategy of the present invention, as described in greater detail below.

Figure 2:
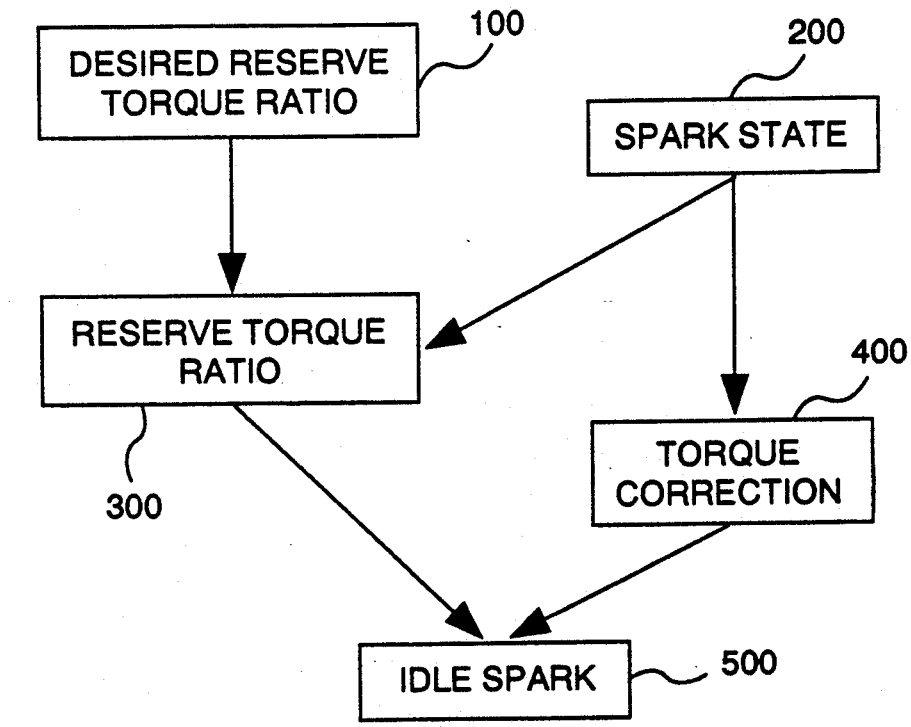
FIG. 2 is a high level flow chart illustrating the method of the present invention for use with the controller shown in FIG. 1.

Referring now to FIG. 2, there is shown a high level flow chart illustrating the method of controlling combustion engine timing of the present invention, which implements a torque-based feedback spark at idle. In the preferred embodiment, the feedback spark strategy is a closed-loop control strategy which operates during engine idle and attempts to maintain a desired engine idle RPM by increasing and decreasing engine torque through spark advance adjustments. A spark advance adjustment is the preferred adjustment due to the speed with which such an adjustment can be effected. Once the torque disturbance is rejected through a spark adjustment, desired idle speed can be maintained by modifying air charge. For example, desired idle speed can be maintained by increasing air charge and retarding spark advance. Thus, as the air charge is varied, a spark advance adjustment is made in preparation for a subsequent torque disturbance.

More specifically, the electronic control module 16 reacts to an RPM error from the desired idle RPM with an adjustment to spark advance. Idle RPM control is thus accomplished in conjunction with the normal idle speed control and fuel strategies executed by the electronic control module 16, which need not be discussed in detail for purposes of the present invention. The present invention utilizes spark advance to maintain engine idle speed during torque variations, since spark advance is the quickest responding output of the electronic control module 16 which directly affects engine output torque.

The following is a glossary of abbreviations for terms utilized throughout this disclosure:

$AM$ = air mass flow $AM_{DES}$ = air mass flow at the desired engine idle RPM $AM_{CAL}$ = air mass flow increase due to the calibrated load imposed on the system $AM_{LDD}$ = AM needed to maintain $N_{CAL}$ with an applied torque, $T_{LD}$ $AM_{NLD}$ = needed to maintain $N_{CAL}$ without an applied torque, $T_{LD}$ APT = at part throttle; $-1$ = closed throttle; 0 = part throttle; 1 = wide open throttle $BG_{TMR}$ = background loop time $DND_{SUP}$ = delayed neutral/drive flag; 0 = neutral and 1 = drive $DSD_{RPM}$ = idle speed control desired RPM $DR_{BS}$ = base desired engine speed in drive FBS_ENT$_{COMP}$ = entry into feedback spark state complete FBS_ENT$_{TC}$ = time constant which paces the entry into feedback spark FBS_ENT$_{OK}$ = OK to begin entry into feedback spark state FBS_EX$_{COMP}$ = exit from feedback spark state complete FBS_EX$_{OK}$ = OK to begin exit from feedback spark state FKEXIT = filter constant which paces exit from feedback spark FUNC = function which calculates the torque ratio at which an engine is operating from the $SPK_\Delta$ from $SPK_{MBT}$; shown in FIG. 3

Figure 4:
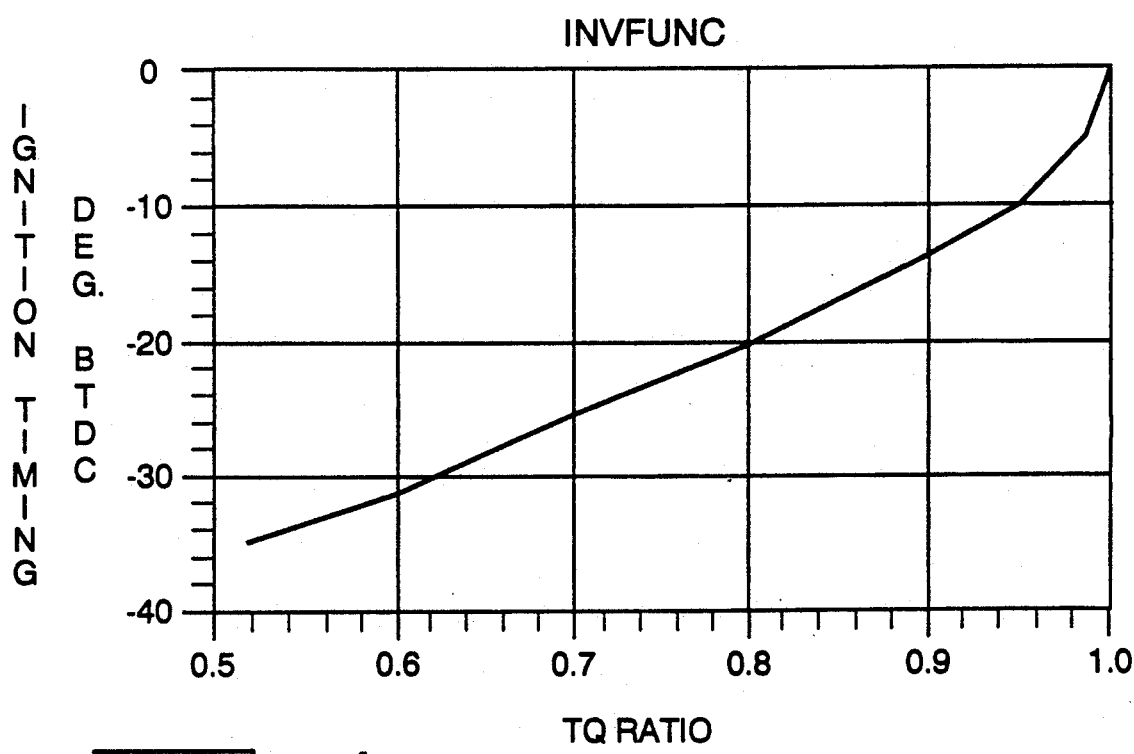
FIG. 4 is a graphical illustration of the negative inverse of the function shown in FIG. 3.

INVFUNC = function which returns a spark retard (°) from $SPK_{MBT}$ as a function of desired torque ratio; shown in FIG. 4

$ISC_{FLG}$ = ISC mode indicator flag; $-1$ = dashpot mode, 0 = dashpot preposition mode: 1 = closed-loop RPM control mode; and 2 = lockout entry to RPM control K = constant of proportionality relating air mass flow, torque and RPM $K_{SPK}$ = proportional gain applied to control error LAST_LD$_{MBT}$ = load from the last pass corrected to the value the load would have at $SPK_{MBT}$.

$MIN_{MPH}$ = minimum speed to enter closed-loop RPM control

N = engine RPM $N_{ACT}$ = actual engine RPM under current operating conditions $N_{CAL}$ = the RPM at which the calibration load ($AM_{CAL}$) test was conducted $N_{DES}$ = desired idle RPM $N_{LDD}$ = RPM when engine is loaded with torque, $T_{LD}$; $N_{NLD}$ = $N_{CAL}$ during calibration test $N_{NLD}$ = RPM when engine is not loaded with torque, $T_{LD}$; $N_{NLD}$ = $N_{CAL}$ during calibration test $NU_{BS}$ = base desired engine speed in neutral SPK = calculated spark SPK_ABS$_{LIM}$ = an absolute spark limit which preferably is not exceeded SPK$_{CTRL}$ = threshold above base $DSD_{RPM}$ below which spark feedback can be entered $SPK_\Delta$ = spark delta offset from $SPK_{MBT}$ which was calculated via the torque ratio calculations; equals $SPK_{MBT}$ − SPK_ABS$_{LIM}$ SPK_FBS$_{GAIN}$ = feedback spark control proportional gain term; normally calibrated to "1" in order to exactly compensate for torque disturbances; unitless SPK_FLEX$_{LIM}$ = desirable spark limit which may be exceeded briefly when torque is required by a strategy, such as feedback spark or engine torque oscillation modulation.

SPK_LOAD$_{RES}$ = desired torque (expressed as load) which the feedback spark calculation can supply to compensate for a torque disturbance to the engine, unitless $SPK_{MBT}$ = the spark advance required for maximum brake torque $SPK_{ST}$ = defines the use of feedback spark; 0 = feedback spark is not being used; 1 = transitioning into feedback spark; 2 = using the feedback spark calculation, and 3 = transitioning out of feedback spark $SPK_{TMR}$ = timer used to pace the transition into feedback spark $T$ = engine torque $SPK_{TAR}$ = throttle angle rate of change $T_{ACT}$ = actual engine torque under current operating conditions $TP$ = instantaneous throttle position $TP_{LST}$ = previous A/D reading of TP $TR_{AV}$ = the ratio of torque available for use by advancing spark $TR_{COR}$ = the amount of torque ratio correction which reflects and compensates for a torque disturbance; added by advancing spark $TR_\Delta$ = when torque ratio change is less than $TR_\Delta$ then entry to or exit from feedback spark is complete $T_{DES}$ = engine torque at desired RPM $T_{LD}$ = calculated torque of an applied load $T_{LDD}$ = total torque supplied by the engine when it is loaded with a test load. $T_{LDD} = T_{NLD} + T_{LD}$ $T_{NLD}$ = total torque supplied by the engine before it is loaded with a test load ($T_{LD}$)

$TR_{ENG}$ = torque ratio supplied by the engine $TR_{RES}$ = a reserve of torque which is created by retarding spark below $SPK_{MBT}$ $TR\_RES_{LAST}$ = last pass value of $TR_{RES}$ $tr\_res_{DES}$ = desired reserve torque ratio $tr\_flex$ = torque ratio at the flexible spark limit $V\_MODE_{setup}$ = 1 = use normal spark for VIP operating mode $VS_{BAR}$ = filtered vehicle speed It should be noted that terms appearing in this disclosure and in the drawing figures as "lower case" represent temporary variables whose values are stored in miscellaneous temporary registers in the electronic control module 16, whereas terms appearing as "upper case" represent variables whose values are stored in permanent registers in the electronic control module 16.

Figure 3:
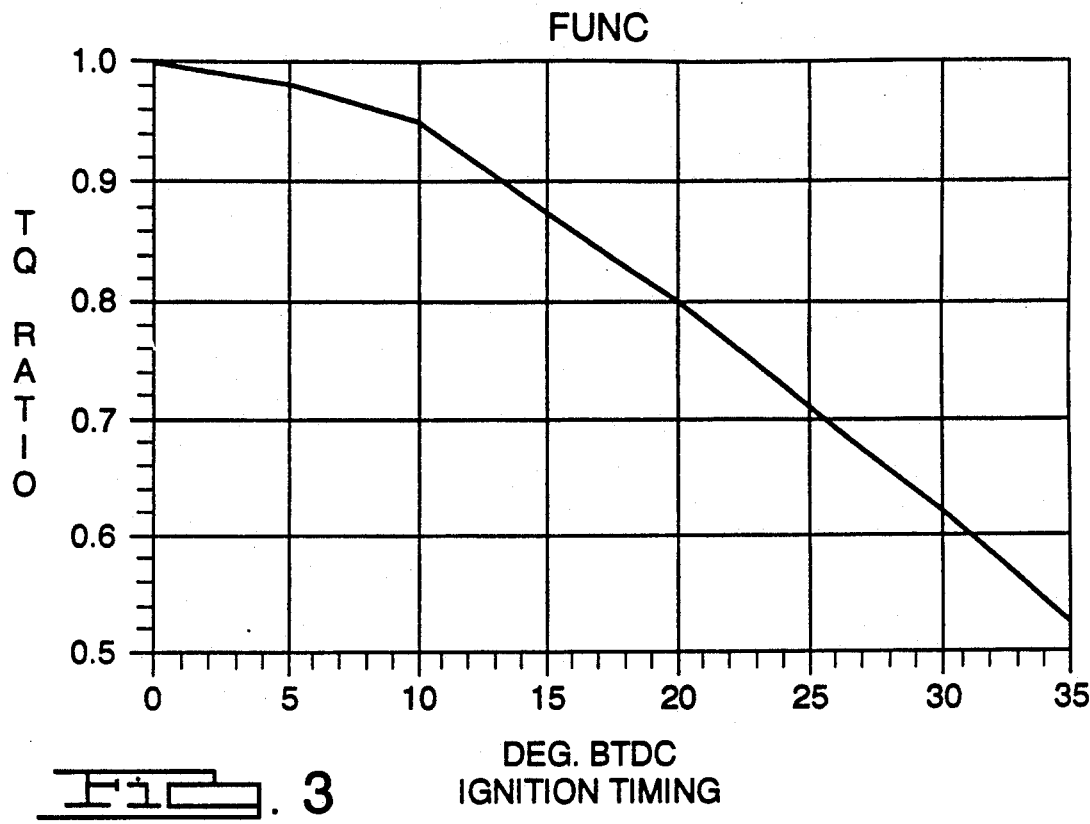
FIG. 3 is a graphical illustration of a function which relates spark offset from MBT to a torque ratio.

Referring now to FIGS. 3 and 4, the present invention preferably utilizes a pair of functions, labelled as FUNC and INVFUNC, respectively, which relate a spark that is offset, or retarded, from the value required for maximum brake torque (hereinafter "MBT spark") and a torque ratio. The existence of this kind of a relationship allows the present invention to compensate for load disturbances imposed on the engine at idle via a torque ratio-based calculation, which in turn, allows a direct calculation of the required spark advance.

Preferably, the strategy is based on actual mapping data obtained from a calibration procedure with the data being entered in Table I, shown below, which is preferably store d in a ROM memory of the electronic control module 16.

TABLE I

| DEG. BTDC | TORQUE RATIO |
|---|---|
| 0 | 1.00 |
| 5 | 0.99 |
| 10 | 0.95 |
| 15 | 0.88 |

TABLE I-continued

| DEG. BTDC | TORQUE RATIO |
|---|---|
| 20 | 0.80 |
| 25 | 0.71 |
| 30 | 0.62 |
| 35 | 0.52 |

With reference now to FIG. 3, the input, shown along the horizontal axis, is the amount the spark is retarded from MBT spark, measured in degrees (°). The output, shown along the vertical axis, is the ratio of delivered engine torque at a particular spark advance to the engine torque delivered when the engine is operating at MBT spark. In other words, when the engine is operating at MBT spark, the torque ratio is 1.0 and when the operating point is retarded from MBT spark, the resulting torque ratio will be a dimensionless fractional value, such as 0.80 or 0.90.

The spark/torque function table values shown above in Table I were obtained from engine mapping data and represent typical numbers for a given engine design. To obtain these numbers, for example, an engine was operated at a desired idle speed and a particular air charge (i.e. load), and the spark advance was set at MBT spark ($SPK_{MBT}$). The brake torque and the friction torque were observed and recorded at these initial conditions. Next, the spark advance value was retarded by a predetermined amount ($SPK_x$), such as five degrees (5°), and the brake torque and the friction torque were observed and recorded again. This process was repeated a number of times, resulting in Table I.

It should be noted that the indicated torque is a combination of brake torque and friction torque. From the indicated torque values, the torque ratio can be calculated as follows:

$$TR = \frac{T @ SPK_x}{T @ SPK_{MBT}} \quad (1)$$

Referring now to FIG. 4, there is graphically illustrated another function, labelled as INVFUNC, which also relates spark and torque ratio. It can be seen that the function shown in FIG. 4 is a "mirror image", or a negative inverse, of the function shown graphically in FIG. 3. Similarly, a table of values, shown below in Table II, which represents INVFUNC, is stored in the ROM memory of the electronic control module system 16:

TABLE II

| DEG. BTDC | TORQUE RATIO |
|---|---|
| 0 | 1.00 |
| −5 | 0.99 |
| −10 | 0.95 |
| −15 | 0.88 |
| −20 | 0.80 |
| −25 | 0.71 |
| −30 | 0.62 |
| −35 | 0.52 |

The derivation of the relationships which express engine behavior via torque ratios will be reviewed first, followed by a detailed explanation of the determination of the spark required to maintain a desired idle speed.

The strategy of the present invention is utilized to determine the torque ratio to be supplied by the engine ($TR_{ENG}$) to maintain a desired idle speed. As described in greater detail below, $TR_{ENG}$ is converted to a spark advance utilizing INVFUNC and adding that spark advance to the MBT spark value. $TR_{ENG}$ is determined from the torque ratio available ($TR_{AV}$), torque ratio reserve ($TR_{RES}$) and a torque ratio correction ($TR_{COR}$), such that:

$$TR_{ENG} = TR_{AV} - TR_{RES} + TR_{COR} \quad (2)$$

Figure 5:
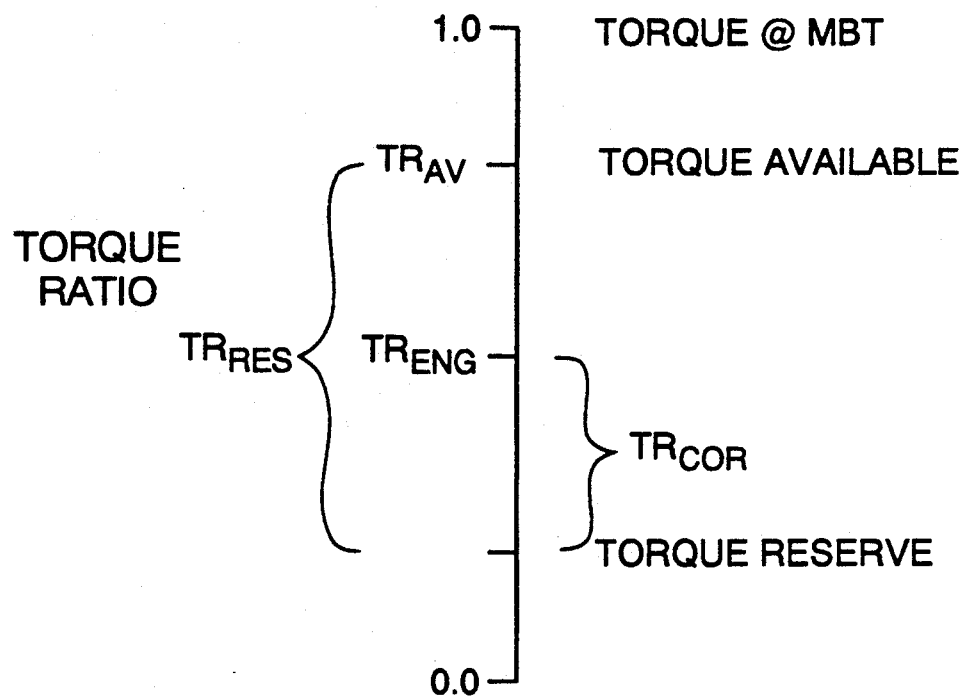
FIG. 5 is a graphical representation of the determination of the torque ratio supplied by the engine.

This relationship is shown graphically in FIG. 5.

$TR_{AV}$, the ratio of torque available for use, is the torque ratio supplied if the engine were operating at the MBT or absolute spark limit. $TR_{RES}$ is a reserve of torque preferably expressed as a torque ratio, which is created by retarding the spark advance below MBT. This reserve of torque is made available to the control system 10, shown in FIG. 1, to compensate for torque disturbances and is essentially the only calibratable part of the strategy. The desired torque to be held in reserve by operating retarded from MBT is calibrated through the parameter SPK_LOAD$_{RES}$. $TR_{COR}$ is the amount of torque, expressed at a torque ratio, which reflects a torque disturbance as measured by an engine RPM error. This torque compensates for the torque disturbance and is supplied by the engine as a result of advancing the spark value.

It is possible to relate engine work rate to the energy contained in the air fuel mixture and, therefore, to air flow rate. Work rate can also be expressed via torque and RPM and the two measures can be fundamentally related through a constant of proportionality:

$$N*T = K*AM \quad (3)$$

Since the present invention utilizes a ratio approach, it will be seen that K drops out of the equations and does not need to have a specific value. A useful restatement of this relationship is:

$$T = \frac{K*AM}{N} \quad (4)$$

As shown in FIG. 3, FUNC references MBT spark. It is therefore necessary to know the amount of torque ratio lost and hence the amount of torque ratio available, since other parts of the spark calculation request less than MBT spark:

$$SPK_\Delta = SPK_{MBT} - SPK\_ABS_{LIM} \quad (5)$$

Using FUNC directly:

$$TR_{AV} = FUNC(SPK_\Delta) \quad (6)$$

In order to have the ability to add torque to compensate for a torque disturbance, a torque reserve is designed in and is always available. It is preferable to define this reserve as a fixed value of torque. If, however, torque is not measurable in the control module strategies, it can be determined from air mass flow and RPM and the reserve will be created by retarding spark. To determine the torque amount, a procedure is recommended where a calibrator operates the engine at a normal idle, noting air mass and RPM. The calibrator then applies a load which is representative of the desired load rejection. The engine is allowed to stabilize to the same RPM with the load applied and the new air mass is noted. The increase in air mass is calibrated as $AM_{CAL}$ and the RPM at which the test was conducted is calibrated as $N_{CAL}$. The derivation of the air mass flow and RPM based torque ratio follows. From equation (4), $$T_{NLD} = \frac{K*AM_{NLD}}{N_{NLD}} \quad (7)$$

and $$T_{LDD} = \frac{K*AM_{LDD}}{N_{LDD}} \quad (8)$$

Subtracting equation (7) from equation (8), $$T_{LDD} - T_{NLD} = \frac{K*AM_{LDD}}{N_{LDD}} - \frac{K*AM_{NLD}}{N_{NLD}} \quad (9)$$

By definition, $$AM_{CAL} = AM_{LDD} - AM_{NLD} \quad (10)$$

and $$T_{LD} = T_{LDD} - T_{NLD} \quad (11)$$

For the calibration exercise described above, it can be stated that, $$N_{CAL} = N_{LDD} = N_{NLD} \quad (12)$$

$T_{LD}$, a calibrated constant, is then obtained by combining equations (9) through (12), $$T_{LD} = \frac{K*AM_{CAL}}{N_{CAL}} \quad (13)$$

The torque reserve ratio, $TR_{RES}$, can be defined as $$TR_{RES} = \frac{T_{LD}}{T_{ACT}} \quad (14)$$

Utilizing equation (7) and equation (13), $$TR_{RES} = \frac{\frac{K*AM_{CAL}}{N_{CAL}}}{\frac{K*AM_{ACT}}{N_{ACT}}} \quad (15)$$

wherein the numerator has become a constant and the denominator varies with operating conditions. Rearranging, it can be seen that $$TR_{RES} = \frac{AM_{CAL}}{N_{CAL}} * \frac{N_{ACT}}{AM_{ACT}} \quad (16)$$

In this context, the ability to supply a torque correction implies the ability to infer a torque ratio of a system load from an RPM drop. From equation (4), $$T_{DES} = \frac{K*AM}{N_{DES}} \quad (17)$$

and $$T_{ACT} = \frac{K*AM}{N_{ACT}} \quad (18)$$

It should be noted that air mass flow is defined to be the same in equations (17) and (18) in order to relate them to each other. As an aside, air mass flow should not change during RPM dips, providing that sonic flow is maintained across the throttle plate.

By definition, $$TR_{COR} = \frac{T_{ACT} - T_{DES}}{T_{ACT}} \quad (19)$$

Substituting equations (17) and (18) into equation (19), it can be seen that $$TR_{COR} = \frac{\frac{K \cdot AM}{N_{ACT}} - \frac{K \cdot AM}{N_{DES}}}{\frac{K \cdot AM}{N_{ACT}}} \quad (20)$$

Reducing equation (20), the torque ratio correction can be expressed as $$TR_{COR} = 1 - \frac{N_{ACT}}{N_{DES}} \quad (21)$$

A useable torque ratio equation can be obtained by substituting equations (6), (16) and (21) into equation (2), resulting in the following equation:

$$TR_{ENG} = FUNC(S_\Delta) - \quad (22)$$

$$\left( \frac{AM_{CAL}}{N_{CAL}} \cdot \frac{N_{ACT}}{AM_{ACT}} \right) + \left( 1 - \frac{N_{ACT}}{N_{DES}} \right) \cdot K_{SPK}$$

Even though it should not be necessary, $K_{SPK}$ is introduced as a proportional gain term for calibration purposes.

The idle spark value, i.e. the spark advance corresponding to $TR_{ENG}$, can be obtained from INVFUNC:

$$SPK = SPK_{MBT} + INVFUNC(TR_{ENG}) \quad (23)$$

Thus, the strategy of the present invention preferably implements the relationships expressed in equations (22) and (23). There are two benefits from this approach. The present invention linearizes the proportional controller, which allows for the delivery of the right amount of spark correction regardless of operating conditions. Specifically, it prevents overcorrection under some operating conditions, which leads to idle oscillations, and under-correction under other conditions, which lead to large RPM dips when torque loads are applied to the engine at idle. The linearization comes from the formulation of the control parameter N (i.e. engine speed) into $\{1 - N_{ACT}/N_{DES}\}$, which is linear, rather than the traditional $\{N_{DES} - N_{ACT}\}$, which is nonlinear. The present invention also incorporates a correction for the nonlinear relationship between spark advance and torque ratio.

A second benefit of the formulation of the present invention is that it allows the calibrator to calibrate a desired level of load (i.e. torque) rejection. The present invention calculates the appropriate spark retard under all operating conditions, ensuring that adequate load rejection occurs under all operating conditions. At the same time, excessive load rejection capability is prevented. Excessive load rejection capability results from excessive spark retard, which increases fuel consumption and decreases idle quality.

Figure 6:
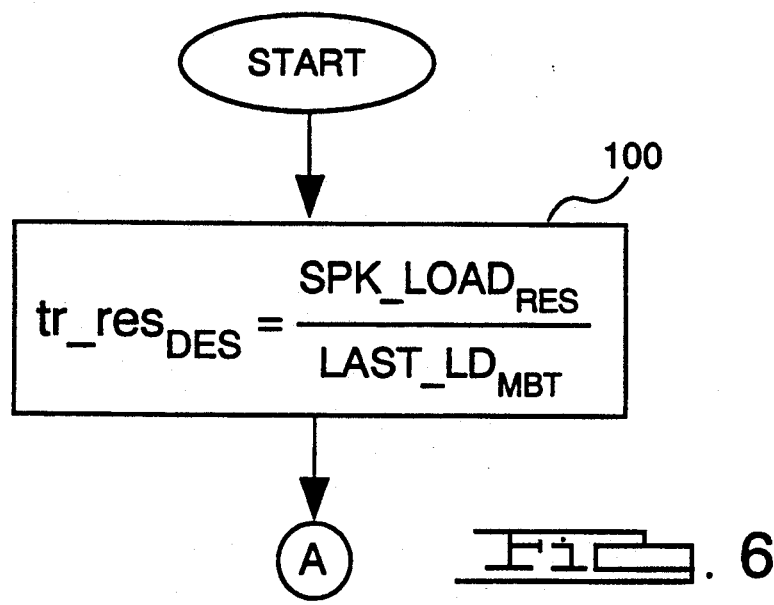
FIG. 6 is a flow chart illustrating the determination of a desired reserve torque ratio.

Referring now to FIGS. 6-10, there are shown flow charts illustrating the determination of the idle spark of equation (23). FIG. 6 illustrates the determination of the desired reserve torque ratio. In order to have the ability to add torque to compensate for a torque disturbance, the present invention utilizes a torque reserve which is always available. As previously stated, this torque reserve is preferably defined as a fixed value of torque. If, however, the control module 16 does not execute strategies for measuring torque, air charge (AC) can be utilized instead of torque, since they are directly proportional to each other. Torque or air charge can be expressed as equivalent dimensionless ratios referred herein as a torque ratio:

$$\frac{T_{LD}}{T_{ACT}} = \frac{RPM \text{ error}}{RPM_{ACT}} = \frac{\Delta AC}{AC_{ACT}} \quad (24)$$

It should be appreciated that when a ratio is used, many simplifications result.

In the preferred embodiment, the calibration of the torque reserve remains substantially constant for all speed-load combinations and is created by retarding spark. To determine the desired amount of torque reserve, the preferred procedure is to operate the engine at a normal idle and record the load and engine RPM. An external torque disturbance can then be applied which is representative of the load rejection desired. Next, the engine is allowed to stabilize to the RPM as before and the desired increase in torque required to maintain this RPM is determined. This increase in load is calibrated by $SPK\_LOAD_{RES}$. Of course, the amount of spark retard required to provide an appreciable load rejection may require a very large spark retard at idle. As a result, feedback spark may be utilized primarily for stabilizing the idle speed.

Thus, at step 100 in FIG. 6, the desired reserve torque ratio is determined utilizing the desired torque (expressed as load) and load corrected to its equivalent value at MBT (i.e. $LAST\_LD_{MBT}$).

Referring now to FIGS. 7a-7e, there are shown flow charts illustrating the determination of spark state ($SPK_{ST}$), which defines the use of feedback spark in the present invention. In the preferred embodiment, there are four (4) spark states. $SPK_{ST}\#0$ corresponds to no feedback spark being utilized. $SPK_{ST}\#1$ corresponds to a transition into feedback spark. $SPK_{ST}\#2$ corresponds to utilization of feedback spark calculation and $SPK_{ST}\#3$ corresponds to a transition out of feedback spark, as described in greater detail hereinbelow.

Figure 7D:
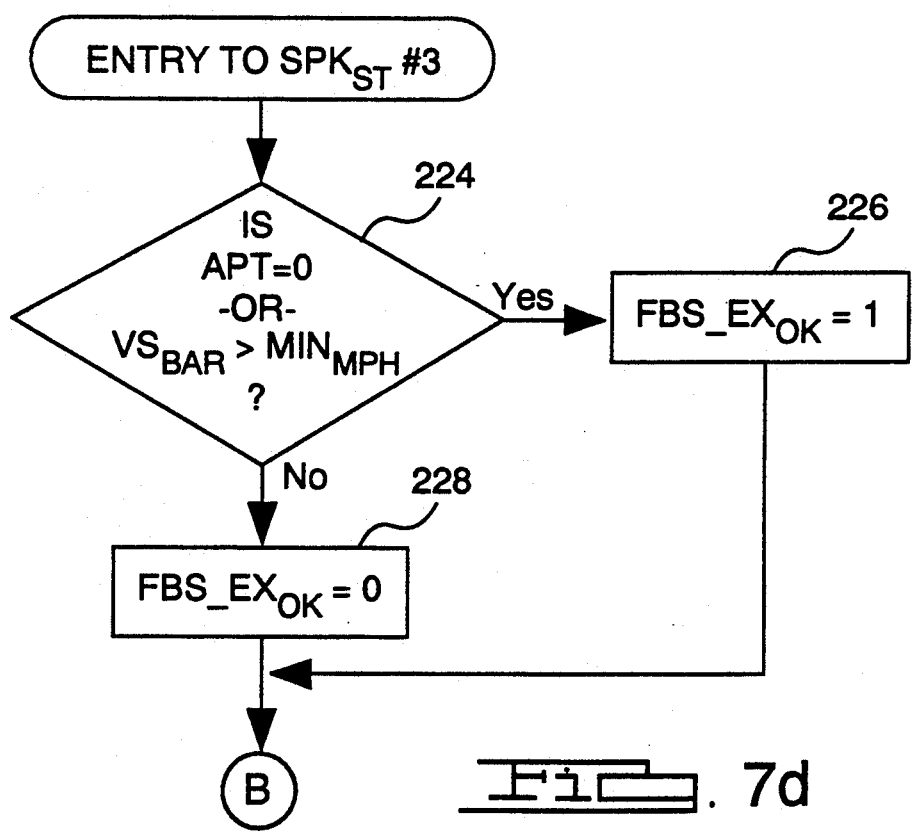
FIGS. 7a–7e are flow charts illustrating the determination of a spark state.
Figure 7A:
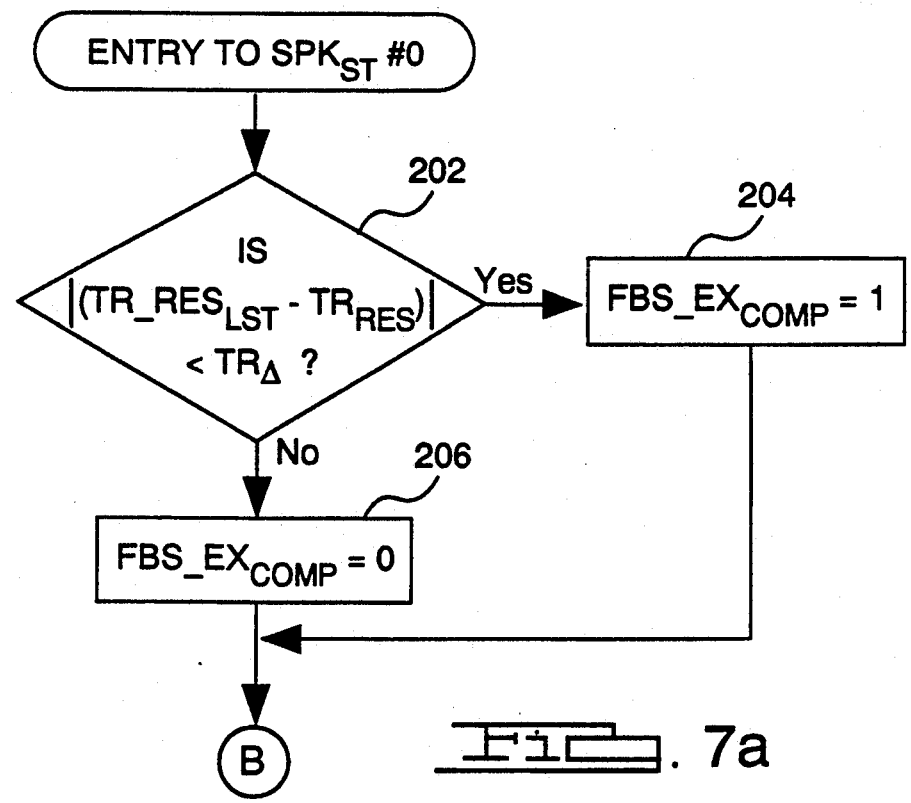

Referring now to FIG. 7a, a flow chart is shown illustrating entry into $SPK_{ST}\#0$, which marks the completion of the transition from feedback spark, as represented by the variable $FBS\_EX_{COMP}$. At step 202, the control module 16 determines whether or not the absolute value of the difference between the last pass value of torque reserve ($TR\_RES_{LST}$) and the present torque ratio reserve ($TR\_RES$), is less than $TR_\Delta$, a predetermined calibration constant which represents a deviation from the torque ratio reserve and which controls entry into feedback spark state #2. Based on that determination, the control module 16 accordingly sets the value of $FBS\_EX_{COMP}$ at steps 204 or 206.

Figure 7C:
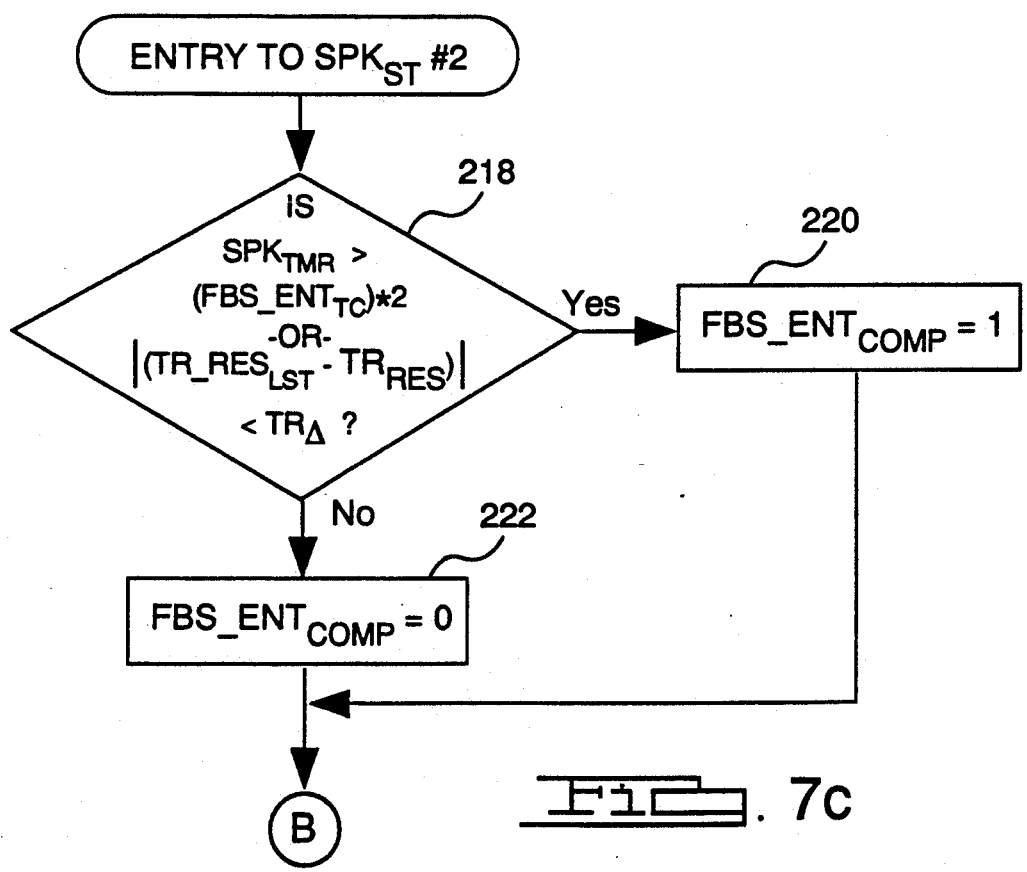
Figure 7B:
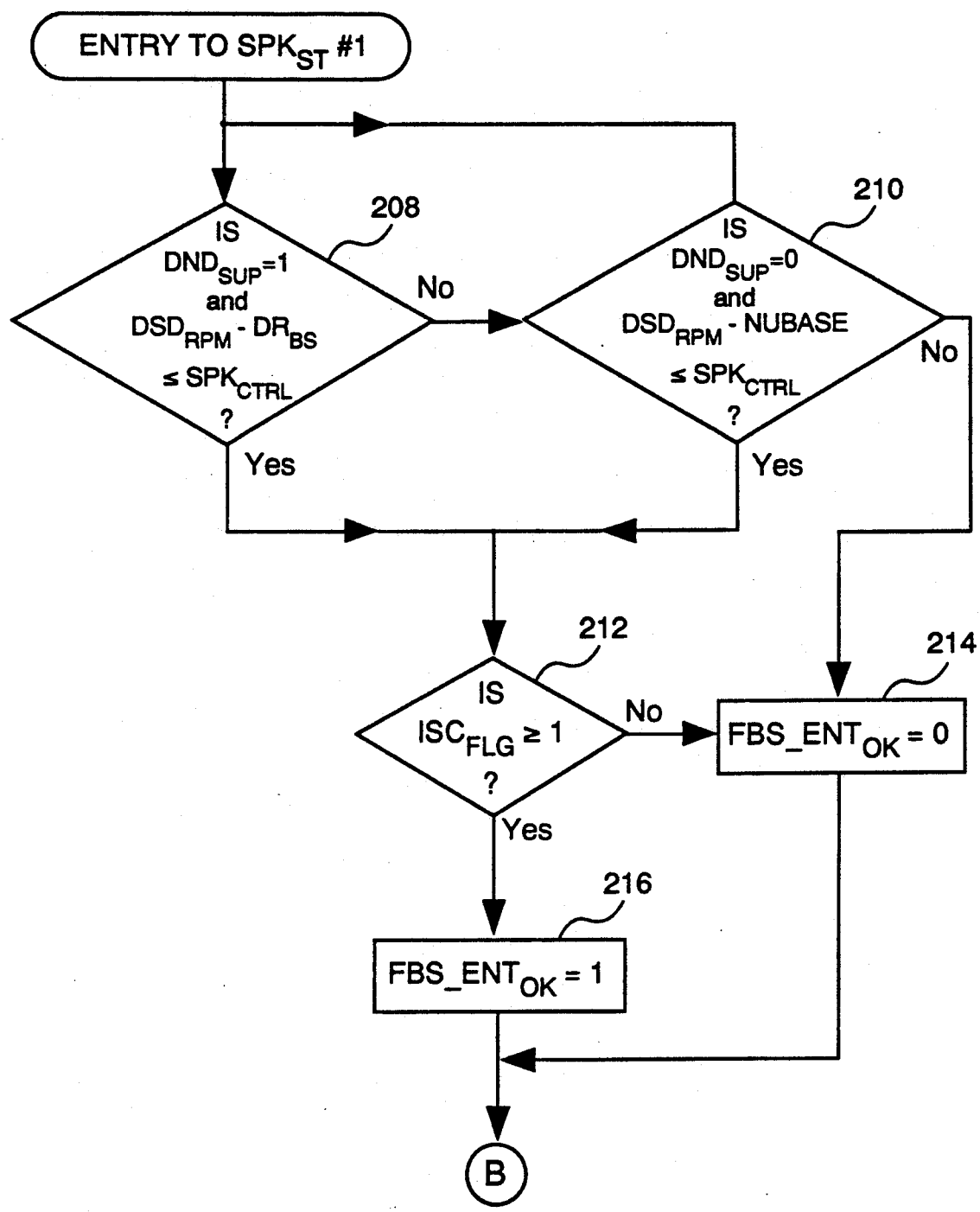

Referring now to FIG. 7b, there is shown a flow chart illustrating the entry conditions to $SPK_{ST}\#1$, which marks a transition into feedback spark calculation. To enter $SPK_{ST}\#1$, certain conditions are preferably satisfied for transition into feedback spark calculations, as represented by the variable (FBS_ENT$_{OK}$). At steps 208 and 210, the control module 16 considers whether the transmission is in a drive gear (DND$_{SUP}$=1) or neutral (DND$_{SUP}$=0) and determines whether the difference between the desired idle speed control RPM (DSD$_{RPM}$) and a base desired engine speed (DR$_{BS}$ for drive, NUBASE for neutral) exceeds the value of the variable SPK$_{CTRL}$, which represents a threshold above DSD$_{RPM}$ below which spark feedback can be entered. At step 212, the control module 16 determines the state of ISC$_{FLG}$, a flag which indicates the air flow control mode. As a result of those determinations, the control module 16 sets the value of FBS_ENT$_{OK}$ at steps 214 or 216, with a value of "1" indicating a transition into SPK$_{ST}$#1.

Referring now to FIG. 7c, there is shown a flow chart illustrating the entry conditions to SPK$_{ST}$#2, the spark state corresponding to use of feedback spark calculation. At step 218, the control module 16 compares the value of SPK$_{TMR}$, a timer used to pace the transition into feedback spark, to a predetermined calibration time constant (FBS_ENT$_{TC}$) which paces the entry into feedback spark. The control module 16 may also perform the comparison previously described at step 202 above. Based on at least one of these comparisons, the control module 16 sets the value of FBS_ENT$_{COMP}$ accordingly at steps 220 or 222, with a value of "1" indicating entry into feedback spark state 2 is allowed.

Referring now to FIG. 7d, a flow chart illustrates the entry conditions to SPK$_{ST}$#3 (i.e. begin transition out of feedback spark calculations or out of entry mode). In setting the value of the feedback spark exit variable (FBS_EX$_{OK}$) at steps 226 or 228, the control module 16 at step 224 determines whether the variable APT has a non-negative value and, if APT has a negative value, compares the filtered vehicle speed (VS$_{BAR}$) to a calibration constant (MIN$_{MPH}$) which represents the maximum vehicle speed allowed to remain in closed-loop RPM control. Preferably, this calibration constant applies to systems having a vehicle speed sensor (VSS), and is set below the speed at which a vehicle having an automatic transmission rolls along in a drive gear without application of the brakes. The effect is to prevent entry into RPM control during parking lot maneuvers. A typical value for MIN$_{MPH}$ is about 3 MPH.

Figure 7E:
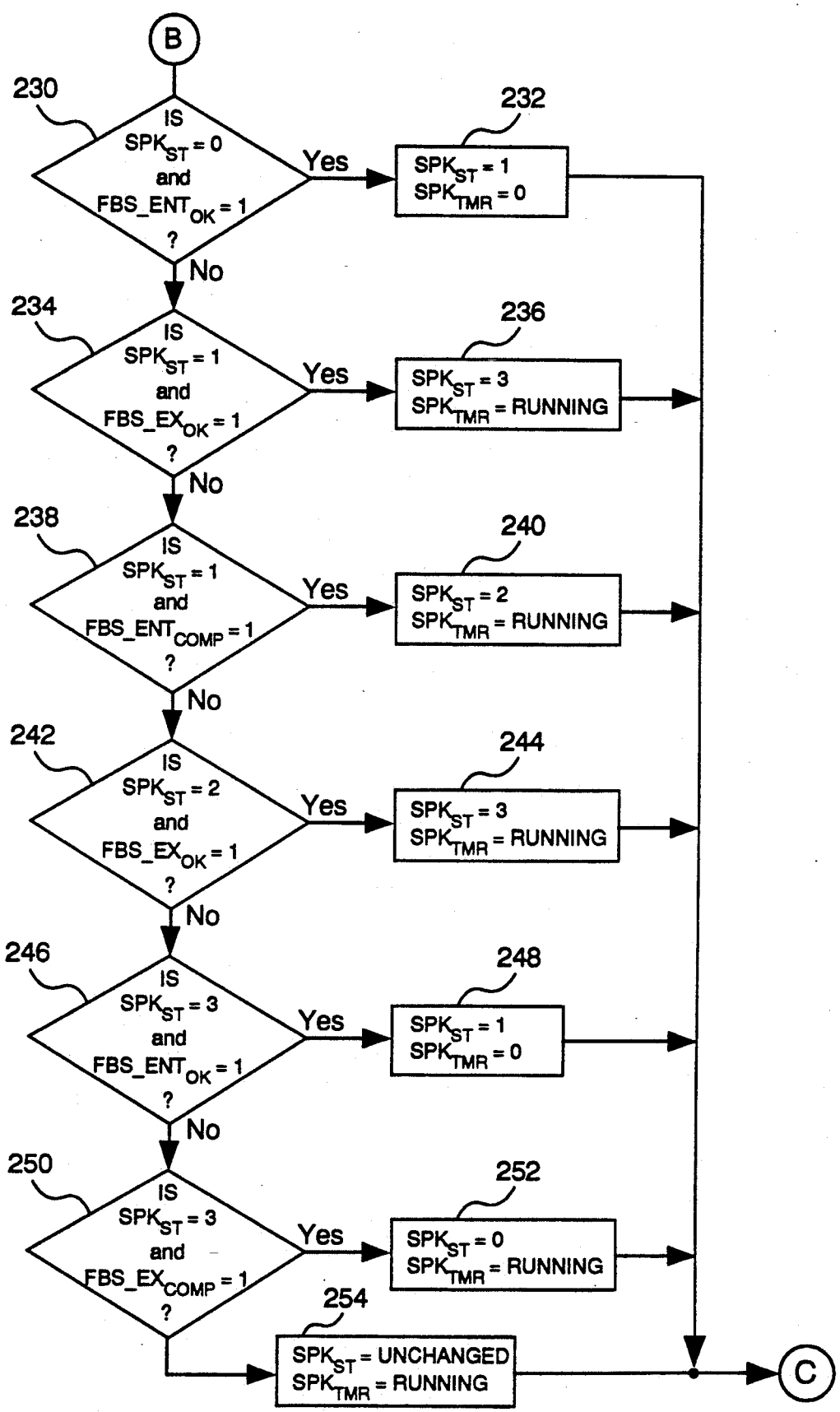

Referring now to FIG. 7e, there is shown a flow chart illustrating the spark state transition logic. As shown, a new spark state is determined based on the present spark state and the value of the various feedback entry and exit variables which were determined with references FIGS. 7a-7d.

At step 230, if feedback spark is not being used and the entry conditions to spark state 1 are satisfied, the control module sets the current spark state to "1" and the value of SPK$_{TMR}$ to "0" at step 232. If the controller is transitioning into feedback spark (i.e. SPK$_{ST}$=1) and the feedback exit conditions are satisfied at step 234, SPK$_{ST}$ is set to "3" and the spark timer is allowed to run at step 236.

With continuing reference to FIG. 7e, a step 238, if the control module 16 is transitioning into feedback spark and the entry transition to feedback spark is complete, the control module 16 begins using feedback spark calculation (i.e. SPK$_{ST}$=2) and the spark timer is allowed to run at step 240.

At step 242, if feedback spark calculations are being utilized and the feedback spark exit conditions are satisfied, the spark state is set to "3" and the spark timer is allowed to run at step 244. If, however, the control module 16 is transitioning out of feedback spark and the feedback spark entry conditions have been satisfied at step 246, the control module sets the spark state to a value of "1" and the spark timer is set to "0" at step 248.

At step 250, if the control module 16 is transitioning out of feedback spark and the feedback spark exit conditions are satisfied, the spark state is set to "0" and the spark timer is allowed to run at step 252. If some other combination of spark state value and feedback spark entry/exit value exists, the spark state remains unchanged and the spark timer is allowed to run as a default at step 254.

Figure 8A:
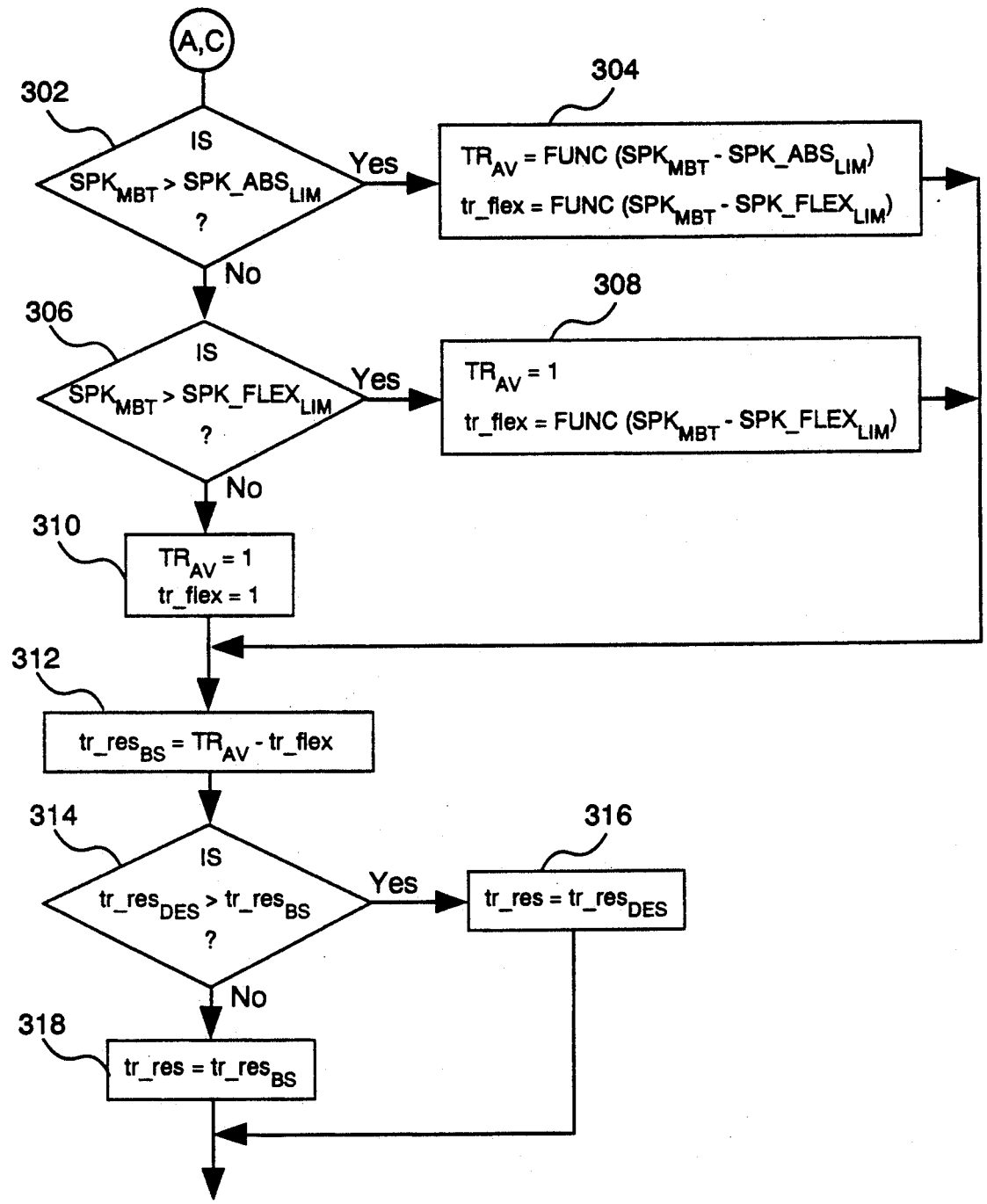
FIGS. 8a–8b illustrate the flow chart for the determination of a reserved torque ratio.
Figure 8B:
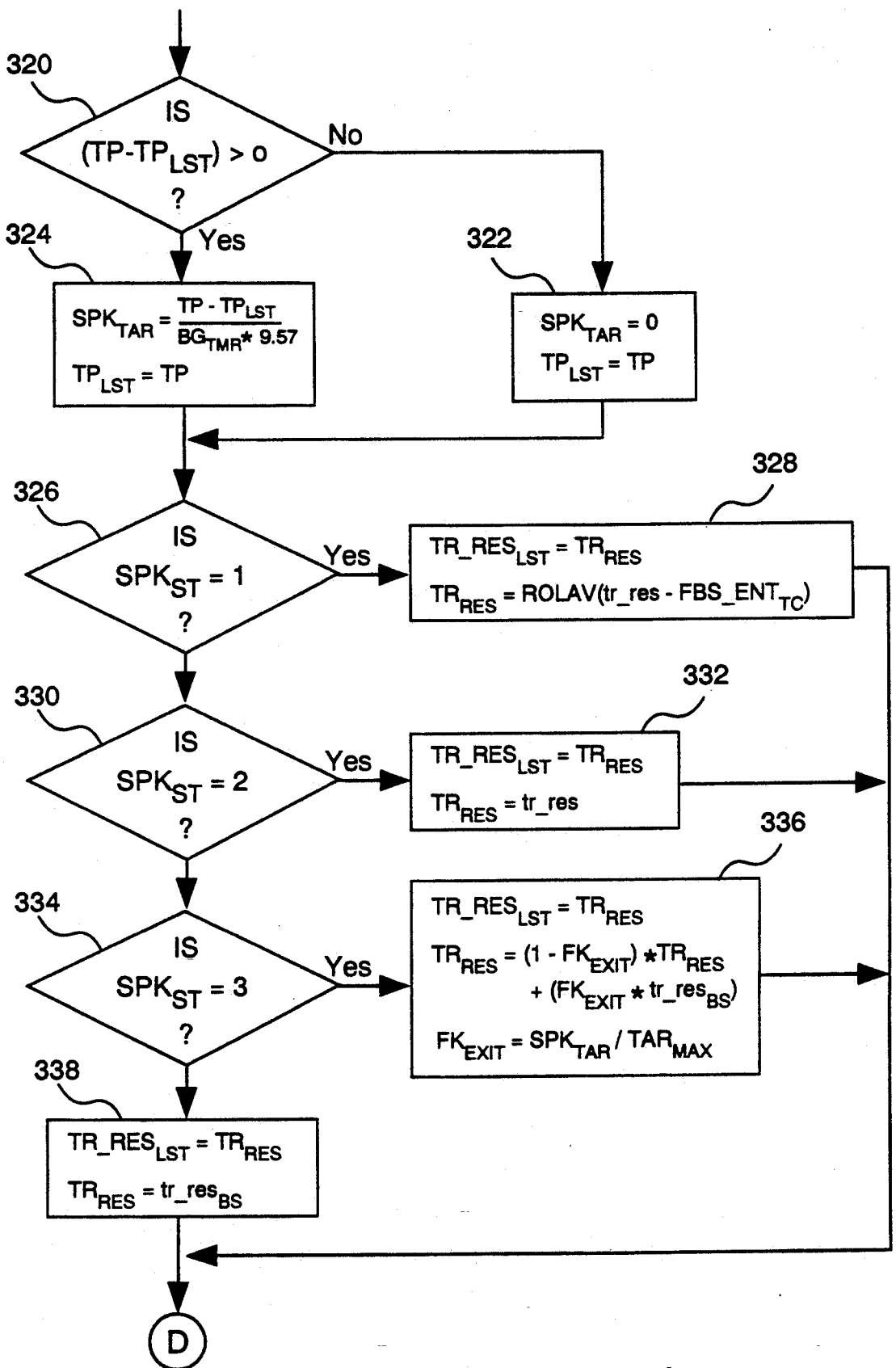

Referring now to FIGS. 8a-8b, determination of the reserve torque ratio will now be discussed. As shown, the reserve torque ratio routine utilizes information previously determined in the desired reserve torque ratio and spark state routines. At step 302, the control module 16 determines whether the MBT spark is greater than SPK_ABS$_{LIM}$, which represents the absolute spark value limit due to detonation, torque limitation or base spark requirements. If the MBT spark exceeds the limit, at step 304 the control module 16 determines an available torque ratio, TR$_{AV}$, and a flex torque ratio tr_flex, utilizing FUNC (shown in FIG. 3). If MBT spark does not exceed the limit, at step 306 the control module 16 determines whether the MBT spark exceeds SPK_FLEX$_{LIM}$. If the MBT spark does exceed the flexible limit, at step 308 the control module 16 sets the value of the absolute torque ratio to "1" and determines tr_flex utilizing FUNC and control flow jumps to step 312. If the tests at steps 302 and 306 both fail, the control module sets TR$_{AV}$ and tr_flex both to a value of "1" at step 310.

With continuing reference to FIG. 8a, at step 312 a base torque ratio reserve (tr_res$_{BS}$) is determined utilizing the available torque ratio and the flexible torque ratio. At step 314, the control module 16 selects the larger of the existing and desired torque reserve ratios by comparing this base torque ratio reserve with tr_res$_{DES}$ and accordingly setting the value of tr_res at step 316 or 318.

Referring now to FIG. 8b, at step 320, the control module 16 determines the change in throttle position. If the throttle position change is negative, SPK$_{TAR}$ is set to zero and the previous throttle position is set to the instantaneous throttle position at step 322. If the change in throttle position is zero or positive, however, SPK$_{TAR}$ is determined at step 324 utilizing the equation shown. The factor "9.57" is the conversion from analog-to-digital counts into degrees of rotation. At steps 328, 332, 336 and 338, the control module 16 determines the torque ratio reserve which is available to compensate for a torque disturbance, based on the determination of the spark state at steps 326, 330 and 334, respectively. Preferably, the value of FKEXIT determined at step 336 is clipped to value between FKEXIT$_{MIN}$ and "1". Thus, upon entry into SPK$_{ST}$#1, TR$_{RES}$ is preferably ramped exponentially from a value of tr_flex to a value of tr_res, utilizing a rolling average routine. TR$_{RES}$ remains at the latter value until the strategy exits via SPK$_{ST}$#3 to SPK$_{ST}$#0, at which time TR$_{RES}$ decays to a value of tr_flex at a rate based on the throttle angle rate. Generally, the greater the throttle rate, the faster the decay.

Figure 9:
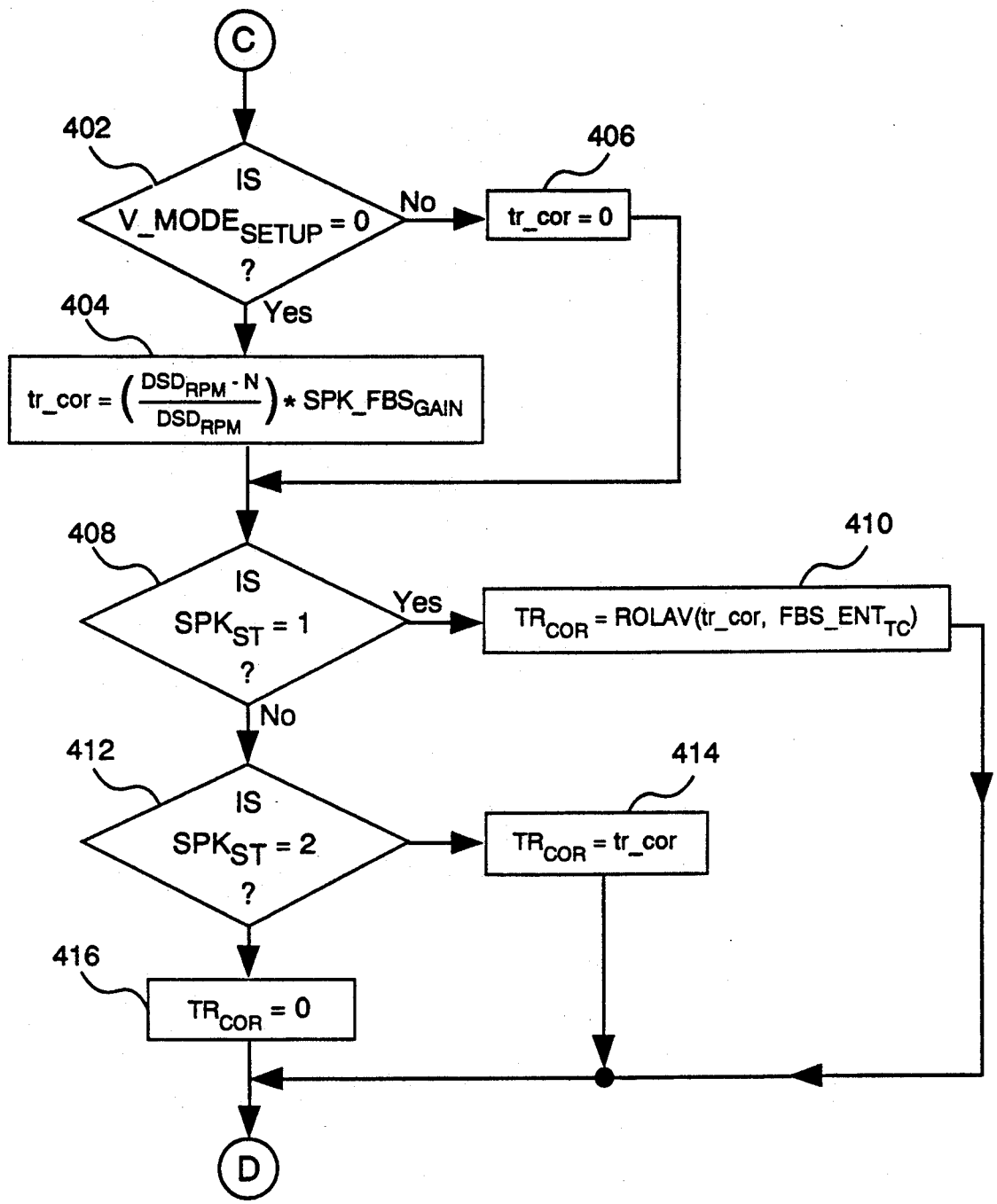
FIG. 9 is a flow chart illustrating the determination of a torque correction required for maintaining the desired idle speed of the engine.

Referring now to FIG. 9, there is shown a flow chart illustrating the determination of the torque correction TR$_{COR}$. As shown, this routine utilizes information from the spark state routines. If the bit flag V_MODE-SETUP equals "0" (step 402), the control module calculates tr_cor based on the desired idle speed RPM (DSD$_{RPM}$), the actual engine RPM (N) and a feedback spark control proportional gain term (SPK_FBS$_{GAIN}$). If the controller is transitioning into feedback spark (step 408), the control module 16 determines the amount torque correction utilizing a rolling average based on tr_cor and FBS_ENT$_{TC}$ at step 410. If, however, the controller is currently utilizing feedback spark (step 412), the control module 16 sets the torque correction equal to the value of tr_cor at step 414. The amount of torque correction is set to "0" if the spark state is equal to "0" or "3" at step 416.

Figure 10:
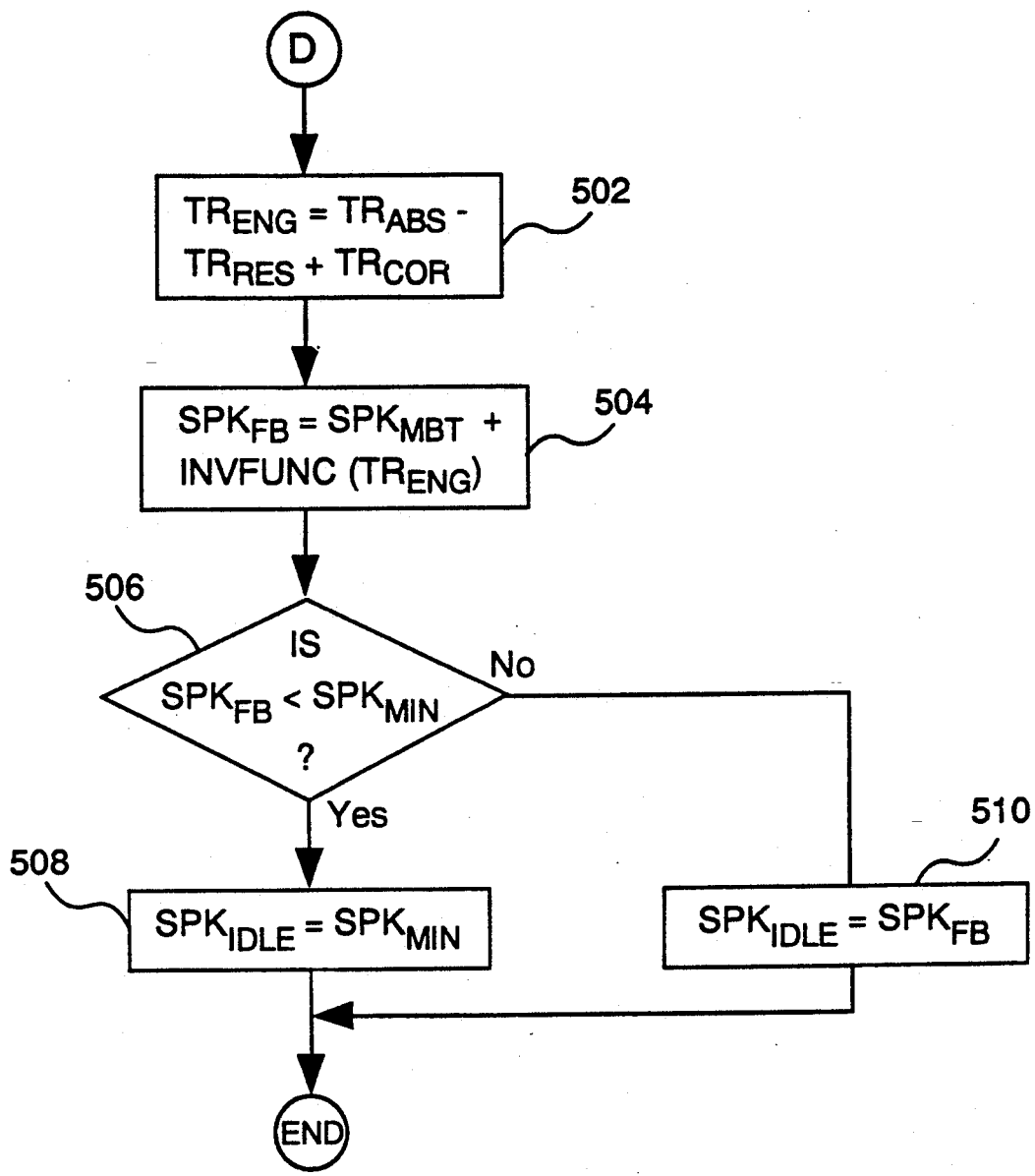
FIG. 10 is a flow chart illustrating the determination of an idle spark which will provide the amount of torque correction.

Referring now to FIG. 10, there is shown a flow chart illustrating the determination of the idle spark, that is, the spark advance which corresponds to the amount of torque correction for maintaining the desired idle speed. As illustrated, the idle spark routine utilizes information from the reserve torque ratio and the torque correction routines. At step 502, the control module 16 determines the torque ratio to be supplied by the engine (TR$_{ENG}$) utilizing TR$_{AV}$, TR$_{RES}$ and TR$_{COR}$. As previously discussed, TR$_{AV}$ is the torque ratio available calculated from the absolute spark limit, TR$_{RES}$ is the torque ratio reserve created by retarding spark below MBT and TR$_{COR}$ is the torque ratio correction required to respond to an RPM error.

At step 504, the control module 16 determines a spark feedback value (i.e SPK$_{FB}$) based on MBT spark and INVFUNC (shown in FIG. 4). This spark feedback value is then compared to a minimum spark feedback value (SPK$_{MIN}$) at step 506. Based on that comparison, the control module 16 sets the value of the idle spark at step 508 or 510. The spark advance is then accordingly adjusted, and the engine produces the torque ratio required to maintain the desired idle speed.

It is to be understood, of course, that while the form of the invention described above constitutes the preferred embodiment of the invention, the preceding description is not intended to illustrate all possible forms thereof. It is also to be understood that the words used are words of description, rather than limitation, and that various changes may be made without departing from the spirit and scope of the invention, which should be construed according to the following claims.

We claim:

1. A method of maintaining the speed of a spark-ignited internal combustion engine operating at a desired idle speed to compensate for engine speed variations caused by a torque disturbance, the engine being controlled according to a control strategy executed by an electronic controller having memory, the method comprising the step of:
   determining a desired final spark advance utilizing an actual idle speed and the desired idle speed expressed as an RPM error ratio to linearize the relationship between RPM error and torque.

2. The method of claim 1 wherein the error ratio (RPM$_{ERRRATIO}$) is $$RPM_{ERR\_Ratio} = \frac{N_D - N_A}{N_D}$$

herein N$_A$ represents actual speed and N$_D$ represents desired idle speed.

3. The method of claim 1 wherein the RPM error ratio is equivalent to the torque disturbance and the operating engine torque, expressed as a torque error ration (TR$_{ERROR}$).

4. The method of claim 1 wherein the RPM error ratio is a signed ratio to allow for the maintenance of the desired idle speed during a torque disturbance caused by an engine load reduction.

5. A method of maintaining the speed of a spark-ignited internal combustion engine operating at a desired idle speed to compensate for engine speed variations caused by a torque disturbance, the engine being controlled according to a control strategy executed by an electronic controller having memory, the method comprising:
   determining a torque ratio available for use at maximum spark advance utilizing a first nonlinear relationship which relates spark advance and torque ratio; and
   determining a desired final spark advance utilizing an actual idle speed and the desired idle speed expressed as an RPM error ratio to linearize the relationship between RPM error and torque, wherein the RPM error ratio is equivalent to the torque disturbance and the operating engine torque, expressed as a torque error ratio (TR$_{ERROR}$).

6. The method of claim 5 further comprising maintaining a normal spark advance at a value retarded from maximum spark advance to create a torque ratio reserve for compensating for the torque disturbance.

7. The method of claim 6 wherein the torque ratio reserve represents the amount of torque ratio correction available to compensate for the torque disturbance.

8. The method of claim 7 wherein the torque ratio correction is of the same magnitude and opposite sense as the torque error ratio.

9. The method of claim 6 wherein the torque ratio reserve is determined from a desired torque reserve (T$_{DES}$) and the operating engine torque (T$_{ENG}$).

10. The method of claim 9 wherein the torque ratio reserve (TR$_{RES}$) is expressed as $$TR_{RES} = \frac{T_{DES}}{T_{ENG}}.$$

11. The method of claim 7 further comprising the step of determining a desired operating engine torque ratio utilizing the torque available, the torque reserve and the torque ratio correction.

12. The method of claim 11 wherein the desired operating engine torque (TR$_{ENG}$) is obtained from the relationship:

$$TR_{ENG} = TR_{AV} - TR_{RES} + TR_{COR}$$

wherein TR$_{AV}$ represents the torque ratio available, TR$_{RES}$ represents the torque ratio reserve and TR$_{COR}$ represents the torque ratio correction.

13. The method of claim 11 further comprising the step of applying the desired operating engine torque ratio to a second nonlinear relationship which relates torque ratio and spark advance, to obtain a spark correction from MBT spark.

14. The method of claim 13 further comprising the step of determining the desired final spark advance value utilizing the spark correction from MBT and MBT spark.

15. The method of claim 13 further comprising the step of modifying the spark advance of the engine to the desired final spark advance value, thereby varying the torque supplied by the engine in order to maintain the desired idle speed.

16. The method of claim 12 wherein the second nonlinear relationship is the negative inverse of the first nonlinear relationship.

17. A method of maintaining the speed of a spark-ignited internal combustion engine operating at a desired idle speed to compensate for engine speed variations caused by a torque disturbance, the engine being controlled by an electronic controller having memory, the method comprising the steps of:
   determining a torque ratio available for use at maximum spark advance utilizing a first nonlinear relationship which relates spark advance and torque ratio;
   maintaining a normal spark advance at a value retarded from maximum spark advance to create a torque ratio reserve for compensating for the torque disturbance;
   determining a torque ratio correction based on an actual idle speed and the desired idle speed, expressed as an RPM error ratio to linearize a second nonlinear relationship between engine RPM error and torque;
   determining a desired operating engine torque ratio utilizing the torque available, the torque ratio reserve and the torque ratio correction;
   applying the desired operating engine torque ratio to a third nonlinear relationship which relates torque ratio and spark advance, to obtain a spark correction from MBT spark;
   determining the desired final spark advance value utilizing the spark correction from MBT and MBT spark; and
   modifying the spark advance of the engine to the desired final spark advance value, thereby varying the torque supplied by the engine in order to maintain the desired idle speed.

18. The method of claim 17 wherein the error ratio ($RPM_{ERRRATIO}$) is $$RPM_{ERR-Ratio} = \frac{N_D - N_A}{N_D}$$

wherein $N_A$ represents actual idle speed and $N_D$ represents desired idle speed.

19. The method of claim 17 wherein the RPM error ratio is equivalent to the torque disturbance and the operating engine torque, expressed as a torque error ratio.

20. The method of claim 17 wherein the torque ratio correction is of the same magnitude and opposite sense as the torque error ratio.

21. The method of claim 17 wherein the torque ratio reserve is determined from a desired torque reserve ($T_{DES}$) and the operating engine torque ($T_{ENG}$).

22. The method of claim 21 wherein the torque ratio reserve ($TR_{RES}$) is expressed as $$TR_{RES} = \frac{T_{DES}}{T_{ENG}}.$$

23. The method of claim 17 wherein the RPM error ratio is a signed ratio to allow for the maintenance of the desired idle speed during a torque disturbance caused by an engine load reduction.

24. The method of claim 17 wherein the third nonlinear relationship is the negative inverse of the first nonlinear relationship.

25. A method of maintaining the speed of a spark-ignited internal combustion engine operating at a desired idle speed to compensate for engine speed variations caused by a torque disturbance, the engine being controlled by an electronic controller having memory, the method comprising the steps of: sensing the actual idle speed of the engine to obtain an idle speed signal;
   determining a desired final spark advance utilizing the actual idle speed and the desired idle speed, the actual and desired idle speeds expressed as an RPM error ratio to linearize a nonlinear relationship between RPM error and torque;
   modifying the spark advance of the engine from a torque reserve value to the desired final spark advance value, thereby varying the torque supplied by the engine in order to maintain the desired idle speed; and
   modifying simultaneously the air charge of the engine and the spark advance, the air charge being modified so as to maintain the desired idle speed as the spark advance is modified from the desired final spark advance value toward the torque reserve value.

26. A method of maintaining the speed of a spark-ignited internal combustion engine operating at a desired idle speed to compensate for engine speed variations caused by a torque disturbance, the engine being controlled by an electronic controller having memory, the method comprising the steps of:
   sensing the actual idle speed of the engine;
   determining a torque ratio available for use at maximum spark advance utilizing a first nonlinear relationship which relates spark advance and torque ratio;
   maintaining a normal spark advance at a value retarded from maximum spark advance to create a torque ratio reserve for compensating for the torque disturbance;
   determining a torque ratio correction based on the actual idle speed and the desired idle speed, expressed as an RPM error ratio, to linearize a second nonlinear relationship between engine RPM error and torque;
   determining a desired operating engine torque ratio utilizing the torque available, the torque ratio reserve and the torque ratio correction;
   applying the desired operating engine torque ratio to a third nonlinear relationship which relates torque ratio and spark advance, to obtain a spark correction from MBT spark;
   determining the desired final spark advance value utilizing the spark correction from MBT and MBT spark;
   modifying the spark advance of the engine from the torque ratio reserve value to the desired final spark advance value, thereby varying the torque supplied by the engine in order to maintain the desired idle speed; and
   modifying simultaneously the air charge of the engine and the spark advance, the air charge being modified so as to maintain the desired idle speed as the spark advance is modified from the desired final spark advance value toward the torque ratio reserve value.

* * * * *